March 17, 1964
N. E. MERRELL
3,125,164
RELEASABLE COUPLING DEVICE
Filed Dec. 4, 1962
3 Sheets-Sheet 1
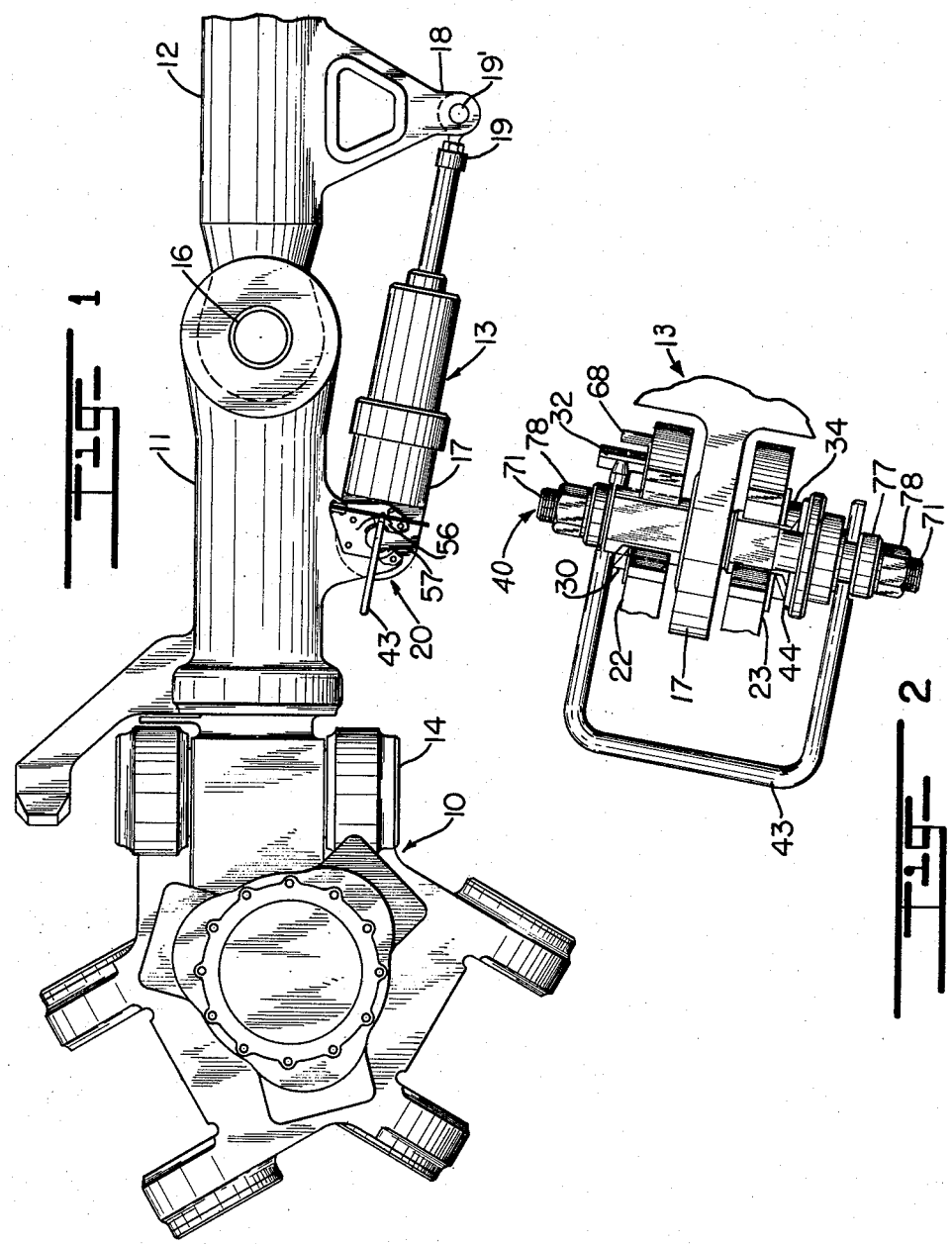
INVENTOR.
NORMAN E. MERRELL
BY
ATTORNEY March 17, 1964
N. E. MERRELL
3,125,164
RELEASABLE COUPLING DEVICE
Filed Dec. 4, 1962
3 Sheets-Sheet 2
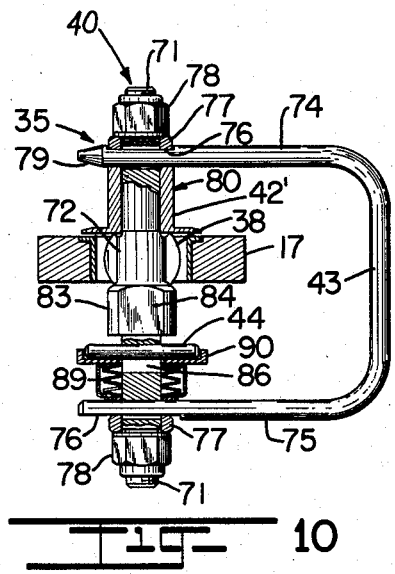
FIG. 10
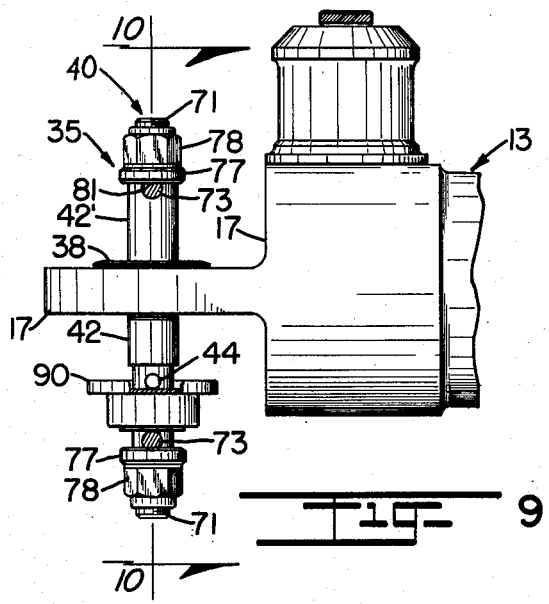
FIG. 9
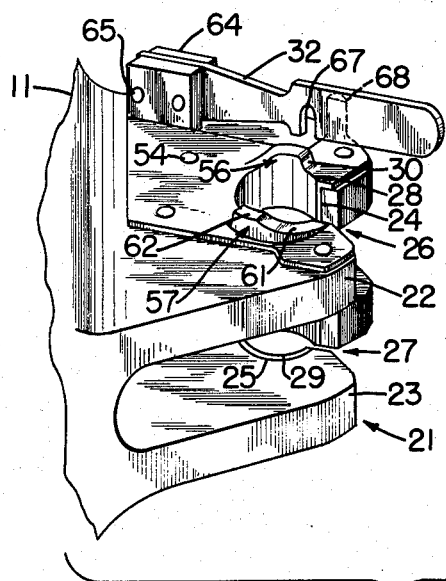
FIG. 3
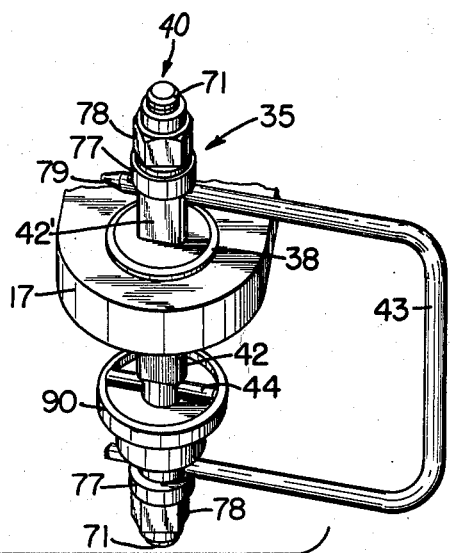
INVENTOR.
NORMAN E. MERRELL
BY
ATTORNEY March 17, 1964
N. E. MERRELL
3,125,164
RELEASABLE COUPLING DEVICE
Filed Dec. 4, 1962
3 Sheets-Sheet 3
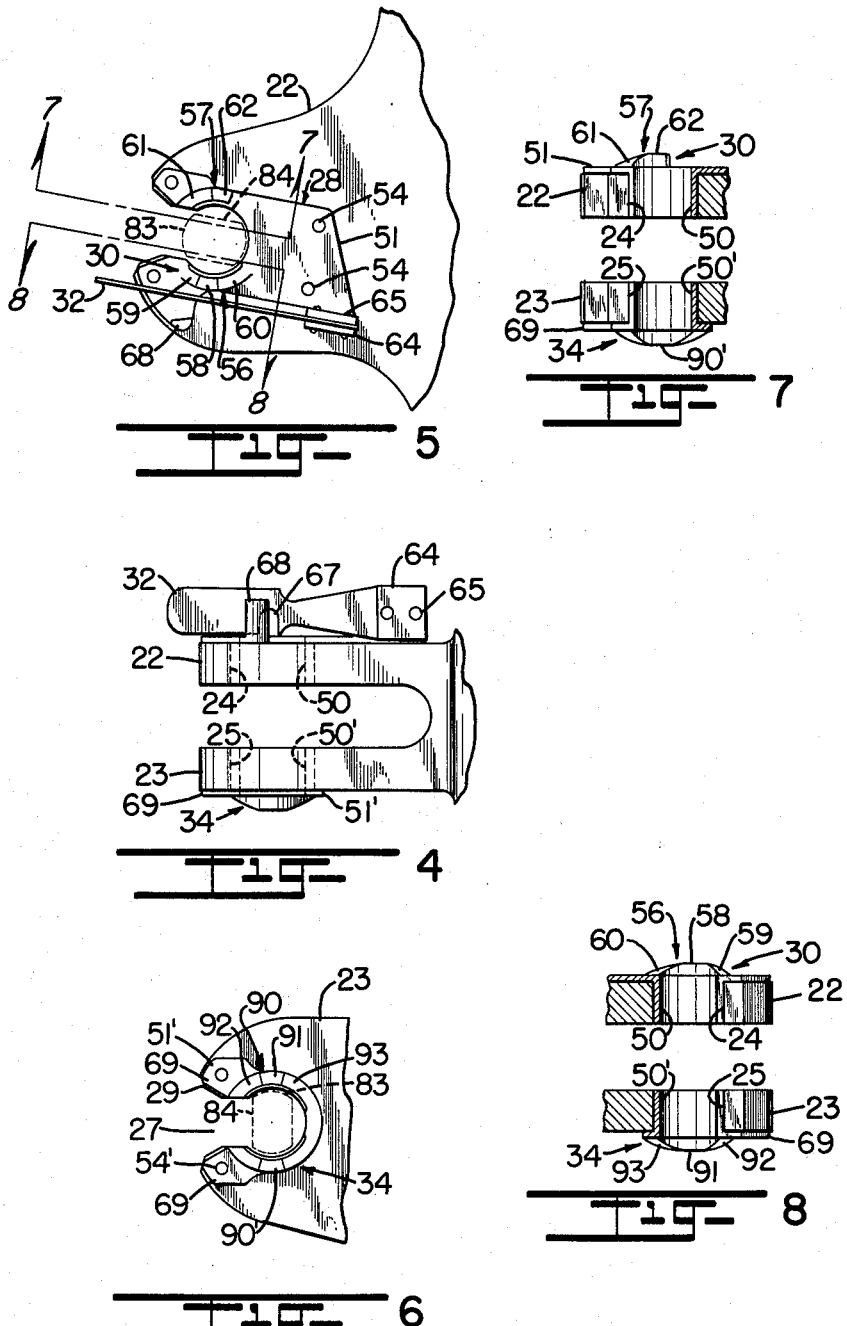
INVENTOR.
NORMAN E. MERRELL
BY
ATTORNEY

United States Patent Office 3,125,164
Patented Mar. 17, 1964

3,125,164
RELEASABLE COUPLING DEVICE
Norman E. Merrell, Perkiomenville, Pa., assignor to The Boeing Company, Seattle, Wash., a corporation of Delaware
Filed Dec. 4, 1962, Ser. No. 242,135
16 Claims. (Cl. 170—160.12)

This invention relates to a new and improved releasable coupling device, which is particularly adapted for use in effecting rapid and positive connection and disconnection between a damper and rotor blade assembly in a rotary wing aircraft.

The several advantages and features of this invention may be exemplified by reference to its use in conjunction with rotary wing aircraft having rotor blades of the manual folding type. That is, each rotor blade is permitted to rotate about a pivot or fold point, and a damper assembly is connected across the fold point of each rotor blade to damp its movement about the fold point. Accordingly, to permit manual folding of each rotor blade, the damper must be disengaged in order to allow the blade to pivot freely about its fold point during blade folding operations.

In accordance with this invention, a releasable coupling has been devised, which will enable positive connection and quick release between the releasable end of each damper and rotor blade assembly to which the releasable end is connected. Specifically, connection and release are effected without the use of tools or the attachment or removal of parts or hardware. Accordingly, this invention eliminates time delays otherwise necessitated by the mechanical removal of parts or the possible loss or misplacement of parts, which are needed when it is desired to reconnect the damper and rotor blade assembly. Additionally, this invention is characterized by the establishment of a firm locking engagement between the members to be connected with little or no play between parts, the absorption of play introduced due to wear of the parts, and the elimination of the need for close tolerances between the elements comprising the assembly.

It is therefore an object of the present invention to provide for a new and improved way of connecting and disconnecting members, such as the dampers and rotor blade assemblies of a rotary wing aircraft, without the use of tools or removal of hardware thereby avoiding loss of parts and time.

It is another object to releasably couple members together in locked relation and in such a way as to enable manual disconnection of the members without loosening or removing parts or using tools while permitting the members to be connected and disconnected in a minimum number of steps.

It is a further object to provide for a releasable coupling, which is specifically adapted for use between a damper and a manually foldable rotor blade assembly in a rotary wing aircraft and which is so constructed and arranged as to firmly establish positive connection between parts, enable manual connection and release without the use of tools in a minimum amount of time, and in general offer reliability and dependability in use.

It is an additional object of the present invention to make provision in a coupling device for improved means, which can be manipulated for selective and positive locking or quick release between the coupling elements.

Other objects of this invention will be readily perceived from the following description, drawings, and claims.

This invention relates to a releasable coupling including female coupling means providing an opening therein with a lateral entrance communicating with the opening and directed outwardly therefrom. The releasable coupling also has male coupling means having locking means movable between a first position to permit insertion of the male coupling means through the lateral entrance into the opening and a second position holding the male coupling means in locked relation within the opening. Further, the male coupling means includes manually actuated means associated therewith for moving the locking means between the first and the second positions. Additionally, the male coupling means has releasable locking means for engaging the manually actuated means to prevent continued movement of the locking means upon movement of the male coupling means to the locked position within the opening.

This invention further relates to a releasable coupling in a rotary wing aircraft for interconnecting one end of a damper assembly and a foldable rotor blade assembly. The releasable coupling includes female coupling means and a male coupling means. The female coupling means is mounted on one of the assemblies and has an opening therein with a lateral entrance slot communicating with the opening and directed outwardly therefrom. The female coupling means also has cam means. The male coupling means is mounted on the other of the assemblies and has locking means thereon. The locking means are rotatable between a first position to enable movement of the locking means into the opening and a second position to hold the locking means in locked relation within the opening. Rotating means are mounted on the locking means for rotating the locking means between the first and the second position. The female coupling means has holding means mounted thereon for engaging the rotating means to releasably lock the rotating means against rotational movement during locked condition of the locking means. Additionally, cam follower means, which are associated with the male coupling means, are responsive to the cam means to position said male coupling means and to yieldingly oppose rotational movement of the lever means toward and away from engagement with the holding means.

The attached drawings illustrate a preferred embodiment of the invention, in which:

FIGURE 1 is a top plan view showing a portion of a rotary wing hub assembly and illustrating the relative disposition between the damper assembly and the rotor blade assembly when in connected relation;

FIGURE 2 is an enlarged fragmentary, side elevational view of a preferred form of releasable coupling device employed between the damper and the rotor blade assembly;

FIGURE 3 is a perspective view of the coupling device with the coupling portions illustrated in disconnected relation;

FIGURE 4 is a detailed side elevation of one portion of the coupling device;

FIGURE 5 is a top plan view of the coupling portion shown in FIGURE 4;

FIGURE 6 is a bottom plan view of the portion shown in FIGURE 4;

FIGURE 7 is a view partially in section taken on line 7—7 of FIGURE 5;

FIGURE 8 is a view partially in section taken on line 8—8 of FIGURE 5;

FIGURE 9 is a side elevational view of a locking pin portion for the preferred form of coupling device as shown in connected relation to the damper assembly; and FIGURE 10 is a view partially in section taken on line 10—10 of FIGURE 9.

Referring to the drawings and particularly FIGURES 1 and 2, the releasable coupling assembly of this invention is illustrated as a means of pivotal connection between a damper 13 and a rotor blade assembly in a rotary wing aircraft. FIGURE 1 is broadly illustrative of the arrangement in a rotary wing aircraft of a rotor hub structure 10, pitch bearing housing 11, rotor blade 12, and the damper or shock absorber assembly 13.

The pitch bearing housing 11 is connected to the rotor hub structure 10 by means of a substantially horizontal pin 14 so that the housing 11 is free to move in a generally vertical direction about the pin 14. This provides the necessary flap hinge articulation of the rotor blade 12. The rotor blade 12 is connected to the pitch bearing housing 11 through a substantially vertical pin 16, which defines the fold point for manual folding of the rotor blade 12 and enables the rotor blade to assume the desired lead and lag angles during flight. In this relation, the damper 13 is employed to damp the lead and lag movements of the rotor blade 12.

One extremity or end 19 of the damper is pivotally connected to an outwardly projecting part 18 of the rotor blade, and the opposite extremity or end 17 is connected by means of a releasable coupling 20 to the housing 11. In this way, the pitch of the blade 12 may be determined by suitable controls (not shown), which are connected for rotation of the pitch bearing housing 11, the blade 12, and the damper 13 as a unit.

As shown in FIGURE 3, the releasable coupling assembly 20 of this invention is broadly comprised of a female coupling portion 21 formed of upper and lower spaced horizontal arm or flanges 22 and 23, which project outwardly from the pitch bearing housing 11. The flanges 22 and 23 are relatively broad and flat with centrally located, vertical bores 24 and 25, respectively, which are aligned to define a common central opening for reception of a rotary or male coupling element 35. Further, the flanges 22 and 23 include vertically aligned, outwardly divergent entrance slots 26 and 27 extending outwardly through the flanges from the respective bores 24 and 25 and generally facing in a direction toward the end 17 of the damper 13.

Upper and lower bushings 28 and 29 are mounted on the flanges 22 and 23 for extension through each of the respective bores 24 and 25. The upper bushing 28 is provided with an upwardly projecting cam member 30 and a flexible locking or holding member 32, and the lower bushing 29 has a downwardly directed cam member 34 (see FIGURE 4), which cooperates with the cam 30 and the locking member 32 to establish releasable locking engagement with the male coupling element 35.

The male or rotary coupling element 35 is positioned at the extremity or arm 17 of the damper 13. The arm 17 broadly comprises an outwardly projecting and relatively flat horizontal projection. The arm 17 has a vertical bore with a bearing 38 mounted therein for reception of a specially designed locking pin 40.

The pin 40 has locking surfaces 42 and 42'. The pin 40 also carries rotating means in the form of a handle 43. The handle 43 rotates the locking surfaces 42 and 42' between locked and unlocked positions. In the unlocked position, the locking surfaces 42 and 42' permit movement of the entire pin 40 through the upper and lower slots 26 and 27 into and out of the central opening defined by the bores 24 and 25. In the locked position, the locking surfaces 42 and 42' are oriented so that when the pin 40 is in the central opening defined by the bores 24 and 25 it is locked therein against outward movement or release through the slots 26 and 27.

In addition, the cam members 30 and 34 are aligned to simultaneously guide and flex the handle 43 into locking relation with the flexible locking member 32 on the upper bushing 28. In this connection, a cam follower 44 is carried on the locking pin 40 and cooperates with the lower cam portion 34 to cause outward flexing of the handle 43 as the handle is rotated and engages the upper cam portion 30 (see FIGURES 1 and 2).

Accordingly, it will be evident that rapid interconnection between the coupling portions can be established by first properly aligning the locking surface portions 42 and 42' on the pin 40 with the slots 26 and 27 on the female coupling portion 21 so that the pin 40 may be inserted into the bores 24 and 25. Thus, the damper arm 17 is interpositioned between the spaced flanges 22 and 23 of the female coupling portion 21. Then, by simply rotating the handle 43, the pin 40 is locked within the bores, while the handle 43 is simultaneously guided into rotational locking engagement with the locking member 32.

Conversely, by first releasing the locking member 32 from engagement with the handle 43, the latter is released for rotation of the pin 40. In this manner, the locking surface portions 42 and 42' may be rotated into alignment with the slots 26 and 27 for disconnection of the coupling portions. Accordingly, the entire assembly may be rapidly connected or disconnected without the use of special tools or removal or loosening of parts.

The female coupling portion 21, as shown in detail in FIGURES 4 to 6, includes the upper bushing 28, which is illustrated as having an annular portion 50 and a flat planar portion 51 in surrounding relation to the upper end of the portion 50. The annular portion 50 is dimensioned for close fitting insertion within the bore 24 and the communicating slot 26. Thus, the planar portion 51 rests against the top surface of the flange 22 and is secured thereto by means of suitable fasteners 54.

The upper cam member 30 is defined by a pair of arcuate cam portions 56 and 57 extending upwardly and perpendicularly to the planar portion 51 and in surrounding relation to the bore 24. The cam portion 56 includes a level upper surface 58 and sloping surfaces 59 and 60 extending from opposite sides of the level surface portion 58 into the surface of the planar portion 51 (see FIGURE 8). However, the cam portion 57 is merely defined by an upwardly sloping surface 61 and a level surface 62 (see FIGURE 7). It should be noted that the surfaces 61 and 62 are substantially diametrically opposite the cam surfaces of the cam portion 56.

As illustrated in FIGURES 4 and 5, the upper bushing 28 also includes a vertically slotted support arm 64 which extends upwardly from the planar portion 51. The support arm 64 has spaced apertures therein to receive suitable fasteners 65 for mounting one end of the flexible locking member 32 within the slotted portion of the support arm 64. Preferably, the locking member 32 is in the form of a leaf spring, which extends forwardly from the support arm 64 above the surface of the planar portion 51 and terminates beyond the outside surface of the flange 22. A suitable notch or opening 67, which is dimensioned to accommodate one extremity of the handle 43, is formed in the locking member or spring 32 directly opposite the level surface portion 58. Additionally, an abutment 68 is disposed on the planar portion 51 in spaced relation to one side of the spring 32 in order to limit horizontal flexing of the spring when it is desired to release the handle 43.

As illustrated in FIGURES 4 and 6, the lower bushing 29 is formed in somewhat the same manner as the upper bushing 28. The lower bushing 29 includes an annular portion 50', which is inserted upwardly through the bore 25, and a planar portion 51', which is seated against the undersurface of the flange 23. As shown in FIGURE 6, the planar portion 51' is of limited extent and merely has two opposed ears 69, which extend forwardly and somewhat outwardly from substantially diametrically opposed cam portions 90 and 90'.

Each of the cam portions 90 and 90' is substantially identically formed. Accordingly, only the cam portion 90 will be described in detail. The cam portion 90 includes a level upper surface 91 and sloping surfaces 92 and 93, which extend from opposite sides of the level surface 91 into the surface of the planar portion 51' (see FIGURES 7 and 8). Additionally, suitable fasteners 54 are employed to fasten the lower bushing structure 29 to the undersurface of the lower flange 23.

As seen in FIGURES 9 and 10, the locking pin 40 for the rotary coupling element 35 is of elongated, generally cylindrical configuration having opposite threaded ends 71 and an intermediate circular surface portion 72 disposed in journaled relation within the bearing 38. Transverse bores 73 extend through the pin 40 in spaced relation above and below the intermediate surface portion 72 for insertion therein of upper and lower handle arm portions 74 and 75. Each of the arm portions 74 and 75 is notched as at 76 to receive annular rings 77 when handle portions 74 and 75 are inserted relation within the bores 73. Nuts 78 are threaded on the ends 71 to urge the rings 77 into the slots and to securely hold the handle 43 in place. Additionally, the upper handle arm portion 74 is provided with a tapered end portion 79 projecting from the pin 40 and being proportioned for locking insertion within the notch 67 of the flexible locking member 32.

In order to position the pin 40 in desired relation on the damper arm or flange 17 with the intermediate surface portion 72 properly aligned with the bearing 38, a sleeve 80 is journaled on the pin or shaft 40 between the upper ring 77 and the top surface of the flange 17. The sleeve 80 includes an arcuate notch 81 for insertion of the upper handle arm portion 74. In relation to the female coupling portion 21, the sleeve 80 is aligned with the upper flange 22 and employs the locking surface 42' for insertion through the outwardly directed slot 26 into the central bore 24. However, beneath the flange 17 the locking surface 42 is formed as an integral part of the shaft 40.

The locking surfaces 42 and 42' have identical external configurations. Accordingly, only the details of the locking surface 42 will be described in detail. As seen in FIGURES 5, 6 and 10, the locking surface 42 preferably comprises alternate arcuate and flat surface portions 83 and 84, respectively. The flat surfaces 84 are formed on substantially diametrically opposite sides of the locking surface 42 in a direction corresponding to the direction of extension of the handle arms 74 and 75.

The distances between the flat surfaces 84 of the locking surfaces 42 and 42' are less than the widths of the upper and lower slots 26 and 27 to allow free passage into the central bores 24 and 25. However, as shown in FIGURE 6, the arcuate surfaces 83 have a diameter substantially equal to the diameters of the bores 24 and 25 but larger than the widths of the slots 26 and 27. Thus, when the pin 40 is inserted within the bores 24 and 25 and the handle 43 is rotated, the pin 40 is securely locked within the female coupling portion 21. An important feature of the present invention resides in the manner in which the handle 43, when rotated to lock the pin 40 in position within the female coupling portion, is simultaneously guided, flexed, and securely locked against further rotation. The cam follower 44 cooperates with the cam portions 34 to yieldingly oppose rotation of the handle 43 toward the locking member 32. For this purpose, a recessed portion 86 (see FIGURE 10) extends through the pin 40 parallel to the bores 73 and directly above the lower bore 73. The cam follower 44 preferably is in the form of a roller (see FIGURE 10) inserted within the recessed portion and biased upwardly against the upper edge of the recessed portion 86 by a compression spring pack 89.

Additionally, the cams 30 and 34, the cam follower 44, and the locking member 32 coact to guide and position the locking mechanism. That is, vertical play or movement of the coupling is eliminated by this coaction. Thus, the damper is positively located for engagement with the female coupling portion 21.

The spring pack 89 exerts an upward force against the cam follower 44 through a washer element 90. As best seen in FIGURE 10, the washer 90 includes a counter- bored portion to retain the cam follower in desired relation within the recessed portion 86. In this position, the cam follower 44 is horizontally aligned with the lower cam 34 and extends in the same direction as the handle arm 74 and the flat surfaces 84. Accordingly, as the pin 40 is passed through the slots 26 and 27 as described, leading ends of the handle arm 74 and the cam follower 44 slide between the respective cam portions along the upper and lower planar portions 51 and 51', respectively. When the handle 43 is then rotated in a clockwise direction, as viewed in FIGURE 1, the portions of the handle arm 74, which are on opposite sides of the pin 40, will ride upwardly on the sloping surfaces 60 and 61 of the upper cam portion. Simultaneously, the roller surfaces, which extend on opposite sides of the pin 40, will be urged downwardly across the lower sloping cam surfaces against the bias of the spring pack 89. In this manner, a spreading or outward flexing action is exerted on the handle 43.

As the handle arm portion 74 and the cam follower 44 continue to rotate, the outer extremity 79 of the handle arm 43 will move across the level surface 58 and against the locking spring 32. This urges the locking spring somewhat outwardly away from the cam portion 56 until the extremity 79 moves into alignment with the notch 67. At this point the spring 32 will return to hold the handle 43 against further rotation. In this relation, it will be noted that the opposite side of the handle arm portion 74 will be resting on the level surfaces 58 and 62, and the cam follower 44 is resting on the level surfaces of the cam 34. Due to the upward force exerted by the compression spring pack 89, the handle 43 is securely and firmly held against accidental release and thus causes the handle 43 to flex slightly and press firmly against the upper and lower cam surfaces 30 and 34. It should be understood that an upwardly extending stop may be substituted for the surface 59 of the arcuate cam portion 56 to insure that the handle 43 will not be rotated beyond the slot 67 in the member 32.

It is believed that the manner of connection of the coupling portion has been made clear from the foregoing description; however, to disengage the damper assembly from the flanges 22 and 23 of the pitch bearing housing 11, the reverse operation is required. Thus, the locking member 32 must be initially disengaged by manually flexing it outwardly against the abutment 68, or until it clears the end of the tapered extremity 79. Then the handle may be rotated in a counterclockwise direction until the flat surfaces 84 of the locking surfaces 42 and 42' move into alignment with the slots 27 and 26. At this point the entire rotary coupling portion 35 may be released by rotation of the damper 13 about its pivotal connection 19' with the rotor blade projection 18 (see FIGURE 1).

In use, it will be evident that any wear between the parts, especially the handle 43, the cam follower 44, and the cam surfaces 30 and 34, will not cause any loosening or play due to the upward biasing of the cam follower arrangement. Also, the end nuts 78 may be tightened as required to remove any end play in the assembly. Accordingly, in practice the coupling assembly of the present invention enables quick connection and release between members to be connected such as the damper 13 and the rotary blade assembly. However, its ready and effective application to other uses will be readily apparent in view of the many advantages secured by obviating the removal or loosening of parts, or the use of special tools in connecting and releasing the coupling portions.

For purposes of exemplification, a particular embodiment of the invention has been shown and described according to the present understanding thereof. However, it will be apparent that changes and modifications in the arrangement and construction of the parts thereof may be resorted to without departing from the spirit and scope of the invention.

I claim:

1. A releasable coupling comprising female coupling means having an opening therein with a lateral entrance communicating with the opening and directed outwardly therefrom, male coupling means including locking means thereon movable between a first position to permit insertion of said male coupling means through the lateral entrance into the opening and a second position holding said male coupling means in locked relation within the opening, manually actuated means associated with said male coupling means for moving said locking means between the first and the second positions, and releasable locking means engaging said manually actuated means to prevent continued movement of said locking means upon movement of said male coupling means to the locked position within the opening.

2. A releasable coupling according to claim 1 wherein said female coupling means and said male coupling means include cam members and cam follower means therebetween to position said male coupling means and to yieldingly oppose movement of said manually actuated means toward and away from engagement with said releasable locking means.

3. A releasable coupling comprising female coupling means having a central opening therein with a lateral entrance communicating with the central opening and directed outwardly therefrom, rotary coupling means including locking means thereon rotatable between a first position to permit movement of said rotary coupling means through the lateral entrance into the central opening and a second position holding said rotary coupling means in locked relation within the central opening, rotating means including a lever arm on said rotary coupling means for manually rotating said locking means between the first and the second positions, and holding means being normally engageable with said lever arm to releasably lock said rotating means against rotational movement upon rotation of said locking means and rotary coupling means into locked relation within the central opening.

4. A releasable coupling comprising a first coupling portion having a pin journaled therein and a locking portion on said pin, rotating means for said pin including a handle arm extending transversely through said pin and a cam follower member disposed in spaced relation to said handle arm including means biasing said cam follower toward said handle arm; a complementary coupling portion including opposite end surfaces with a pin receiving opening extending therethrough and a lateral entrance slot diverging outwardly from the opening to selectively pass the locking portion therethrough into the opening, oppositely directed cam means at the opposite end surfaces of said complementary coupling portion adjacent to the opening, said cam means being aligned to spreadingly engage said handle arm and said cam follower when said pin is rotated into locking relation within the opening, and a flexible locking member adjacent one of said cam means to lockingly engage said handle arm when said arm is rotated to lock said pin within the opening.

5. A releasable coupling according to claim 4, said handle arm having a portion projecting through said pin, and said flexible locking member being defined by a resilient spring arm being flexible in the plane of rotation of said handle arm and including an opening to receive the projecting portion of said handle arm when said pin is rotated into locked relation with said complementary coupling portion.

6. A releasable coupling according to claim 5, said one cam means having substantially diametrically opposed, inclined cam surfaces sloping outwardly away from the end surface of said complementary coupling portion with one inclined cam surface terminating in level surfaces to engage said handle arm on opposite sides of said pin, and said flexible lock member being disposed adjacent to at least one of said level surfaces with a notch therein to lockingly receive the projecting portion of said handle arm.

7. In a rotary wing aircraft, a releasable coupling for interconnecting a damper assembly and a foldable rotor blade assembly, said releasable coupling comprising female coupling means and male coupling means, said female coupling means being mounted on one of said assemblies and having an opening therein with a lateral entrance slot communicating with the opening and directed outwardly therefrom, said male coupling means being mounted on the other of said assemblies, cam means on said female coupling means, said male coupling means having locking means thereon rotatable between a first position to enable movement of said locking means into the opening and a second position to hold said locking means in locked relation within the opening, rotating means mounted on said locking means for rotating said locking means between the first and the second positions, holding means being mounted on said female coupling means for engaging said rotating means to releasably lock said rotating means against rotational movement during locked condition of said locking means, and cam follower means associated with said male coupling means and responsive to said cam means to position said male coupling means and to yieldingly oppose rotational movement of said rotating means toward and away from engagement with said holding means.

8. In a rotary wing aircraft, a releasable coupling for interconnecting a damper assembly and a foldable rotor blade assembly, said releasable coupling comprising female coupling means and male coupling means, said female coupling means being mounted on one of said assemblies and having an opening therein with a lateral entrance slot communicating with the opening and directed outwardly therefrom, said male coupling means being mounted on the other of said assemblies, cam means on said female coupling means, said male coupling means having locking means including locking surfaces thereon for mating with the opening, said locking means being rotatable between a first position to enable movement of said locking means into the opening and a second position to hold said locking means in locked relation within the opening, rotating means including lever means mounted on said locking means for rotating said locking means between the first and the second positions, releasable holding means mounted on said female coupling means for engaging said lever means to releasably lock said rotating means against rotational movement during locked condition of said locking means, and cam follower means associated with said male coupling means and responsive to said cam means to position said male coupling means and to yieldingly oppose rotational movement of said rotating means toward and away from engagement with said holding means.

9. In a rotary wing aircraft, a releasable coupling for interconnecting a damper assembly and a foldable rotor blade assembly, said releasable coupling comprising female coupling means and male coupling means, said female coupling means being mounted on one of said assemblies and having a central opening therein with a lateral entrance slot communicating with the central opening and directed outwardly therefrom, said male coupling means being mounted on the other of said assemblies, cam means on said female coupling means, said male coupling means having pin means including locking surfaces thereon for mating with the central opening, said pin means being rotatable between a first position to enable movement of said locking surfaces into the central opening and a second position to hold said pin means in locked relation within the central opening, lever means mounted on said pin means for rotating said pin means between the first and the second positions, flexible holding means mounted on said female coupling means for engaging said lever means to releasably lock said lever means against rotational movement during locked condition of said pin means, and cam follower means associated with said male coupling means and responsive to said cam means to position said male coupling means and to yieldingly oppose rotational movement of said lever means toward and away from engagement with said holding means.

10. In a rotary wing aircraft, a releasable coupling for interconnecting a damper assembly and a foldable rotor blade assembly, comprising first coupling means projecting from one assembly having pin means journaled therein and locking surface means on said pin means, rotating means for said pin means including arm means extending transversely through said pin means, and cam follower means disposed in spaced relation to said arm means including means for biasing said cam follower means towards said arm means; complementary coupling means projecting from the other of said assemblies including spaced end surfaces with a pin receiving opening extending therethrough and a lateral entrance slot diverging outwardly from the opening to selectively pass the locking surface means into the opening, oppositely directed cam means mounted on said spaced end surfaces of said complementary coupling means adjacent to the opening, said cam means being aligned to engage said arm means and said cam follower means when said pin means is rotated into locking relation within the opening, and flexible locking means adjacent one of said cam means to engage said arm means when said arm means is rotated to lock said pin means within the opening.

11. A releasable coupling as claimed in claim 10 wherein said arm means comprises a portion projecting from said pin means, and wherein said flexible locking means comprises a resilient arm being flexible in the plane of rotation of said arm means and including an opening to receive the projecting portion of said arm means when said pin means is rotated into locked relation with said complementary coupling means.

12. A releasable coupling as claimed in claim 11 wherein said one cam means comprises substantially diametrically opposed, inclined cam surfaces sloping outwardly away from the end surface of said complementary coupling means with said inclined cam surfaces terminating in level surfaces to engage said arm means on opposite sides of said pin means, and said flexible lock member being disposed adjacent to at least one of said level surfaces with a notch therein to lockingly receive the projecting portion of said arm means.

13. In a rotary wing aircraft, a releasable coupling for interconnecting a damper assembly and a foldable rotor blade assembly, said coupling comprising upper and lower spaced substantially horizontal flanges on one assembly providing substantially vertically aligned pin receiving openings with a lateral entrance slot communicating with each opening, first cam means on at least one of said flanges adjacent one end of the opening and a flexible lock member adjacent to said first cam means, a substantially horizontal arm on the other of said assemblies adapted for disposition between said spaced flanges including a pin with locking means thereon being rotatable between a first position to enable movement of said locking means through the lateral entrance slots into the openings and a second position locking said locking means within the openings, rotating means for rotating said locking means between the first and the second positions including a lever arm rotatable on said first cam means into locked relation with said flexible lock member when said locking means is rotated to the locked position within the openings.

14. In a rotary wing aircraft according to claim 13, said releasable coupling having second cam means on the other of said spaced flanges at the end of the opening opposite said first cam means, and cam follower means disposed in spaced relation to said lever arm on said locking means for engagement with said second cam means to urge said first and said second cam means to coact for positioning said other assembly and for yieldingly opposing rotational movement of said lever arm away from locking engagement with said flexible lock member.

15. In a rotary wing aircraft according to claim 14, said first and said second cam means being defined by arcuate cam portions to the ends of the openings, said first and said second cam means providing oppositely directed, inclined cam surfaces being formed to cause at least a portion of said lever arm to spread outwardly when rotating into locked relation with said flexible lock member.

16. A releasable coupling, according to claim 3, wherein said female coupling means and said male coupling means include cam members and cam follower means therebetween to position said male coupling means and to yieldably oppose movement of said manually actuated means toward and away from engagement with said releasable locking means whereby there is a firm locking engagement between the members to be connected with little or no play between parts, absorption of play introduced by wear and no need for close tolerances between elements of the assembly.

References Cited in the file of this patent
UNITED STATES PATENTS

| | | |
|---|---|---|
| 96,852 | Van Wagner | Nov. 16, 1869 |
| 393,494 | Whipple | Nov. 27, 1888 |
| 1,199,415 | Poppenhusen | Sept. 26, 1916 |
| 2,658,576 | Mosinskis | Nov. 10, 1953 |
| 2,950,767 | Lemont | Aug. 30, 1960 |